US012645441B2

(12) United States Patent
Sahu et al.

(10) Patent No.: US 12,645,441 B2
(45) Date of Patent: Jun. 2, 2026

(54) SYSTEM AND METHOD FOR MAKING A PROGRAM COMPATIBLE ACROSS MULTIPLE-VERSIONS OF OPERATING SYSTEMS

(71) Applicant: Harness Inc., San Francisco, CA (US)

(72) Inventors: Santosh Sahu, Karnataka (IN); Puneet Agarwal, Bangalore (IN); Sanjay Nagraj, Dublin, CA (US)

(73) Assignee: Harness Inc., San Francisco, CA (US)

( * ) Notice: Subject to any disclaimer, the term of this patent is extended or adjusted under 35 U.S.C. 154(b) by 275 days.

(21) Appl. No.: 18/600,813

(22) Filed: Mar. 11, 2024

(65) Prior Publication Data

US 2025/0284474 A1     Sep. 11, 2025

(51) Int. Cl.
*G06F 8/41*          (2018.01)

(52) U.S. Cl.
CPC ..................................... *G06F 8/47* (2013.01)

(58) Field of Classification Search
None
See application file for complete search history.

(56) References Cited

U.S. PATENT DOCUMENTS

| | | | |
|---|---|---|---|
| 8,533,836 B2 | 9/2013 | Saunders et al. | |
| 10,203,968 B1 | 2/2019 | Lawson | |
| 10,514,909 B2 | 12/2019 | Yahav et al. | |

| | | | | |
|---|---|---|---|---|
| 2015/0370560 A1* | 12/2015 | Tan | .......................... | G06F 9/323 |
| | | | | 717/148 |
| 2017/0269907 A1* | 9/2017 | Goetz | ....................... | G06F 8/30 |
| 2020/0344180 A1* | 10/2020 | Pope | .......................... | G06F 9/24 |
| 2022/0147408 A1 | 5/2022 | Asgar et al. | | |
| 2022/0269520 A1* | 8/2022 | Yamamoto | .......... | G06F 9/45533 |
| 2022/0358214 A1 | 11/2022 | Anderson et al. | | |
| 2023/0052452 A1* | 2/2023 | Choochotkaew | ... | H04L 63/1441 |
| 2023/0362198 A1* | 11/2023 | Jung | ................... | H04L 63/0263 |
| 2023/0385403 A1* | 11/2023 | Czerninski | .......... | G06F 11/3604 |
| 2023/0418934 A1* | 12/2023 | Constable | ............... | G06F 21/51 |
| 2024/0103842 A1* | 3/2024 | Liang | .................. | G06F 9/45516 |
| 2024/0104221 A1* | 3/2024 | Saieva | ................ | G06F 11/3698 |
| 2025/0039239 A1* | 1/2025 | Parla | ................... | H04L 63/1425 |

OTHER PUBLICATIONS

Milano et al., "Creating Complex Network Services with eBPF: Experience and Lessons Learned," IEEE, 2018. (Year: 2018).*

(Continued)

*Primary Examiner* — Ryan D. Coyer

(57)          ABSTRACT

A method for making a program compatible across multiple-versions of Operation Systems (OS) is disclosed. The method includes receiving the program to be attached to function. Next, the method includes compiling the received program using macro to make it agnostic to OS version. The macro includes a conditional branching feature for determining type of syscall based on flag information from a shared map for attaching the program in different OS versions. Thereafter, the method includes attaching the program to the OS based on the determined type of syscall. In one scenario, the program is attached to a first function if the determined type of syscall is of a first type. In another scenario, the program is attached to a second function if the determined type of syscall is of a second type.

20 Claims, 7 Drawing Sheets

(56)     References Cited

OTHER PUBLICATIONS

Ramesh et al., "Stop Hiding The Sharp Knives: The WebAssembly Linux Interface," arXiv, 2023. (Year: 2023).*
Zhou et al., "Electrode: Accelerating Distributed Protocols with eBPF," Usenix, 2023. (Year: 2023).*
Practical Analysis of Stripped Binary Code https://dl.acm.org/doi/10.1145/1127577.1127590.

* cited by examiner

100

300

PROGRAM
104

SEC("KPROBE / SYS_OPEN")
VOID BPF_SYS_OPEN(STRUCT PT_REGS *CTX)
{
   CHAR BUF[PATHLEN];  // PATHLEN IS DEFINED TO 256
    INT RES = BPF_PROBE_READ_USER_STR(BUF), CTX->DI);
}

```
                              MACRO
                               220

#DEFINE BPF_KPROBE_COMMON(NAME, ARGS...)\
NAME(STRUCT PT_REGS *CTX);\
STATIC __ATTRIBUTE__((ALWAYS_INLINE)) TYPEOF(NAME(0)) ____##NAME(\
STRUCT PT_REGS *CTX, ##ARGS);\
TYPEOF(NAME(0)) NAME(STRUCT PT_REGS *CTX) {\U32 INDEXZERO = 0;\
U32 *IS_WRAPPER = BPF_MAP_LOOKUP_ELEM(&IS_SYSCALL_WRAPPER,
&INDEXZERO); \
IF (IS_WRAPPER == NULL) {\
_PRAGMA("GCC DIAGNOSTIC PUSH")\
_PRAGMA("GCC DIAGNOSTIC IGNORED \"-WINT-CONVERSION\"")\
RETURN ____##NAME(___BPF_KPROBE_ARGS(ARGS));\
_PRAGMA("GCC DIAGNOSTIC POP")\
} ELSE {\
STRUCT PT_REGS *REGS = PT_REGS_SYSCALL_REGS(CTX);\
_PRAGMA("GCC DIAGNOSTIC PUSH")\
_PRAGMA("GCC DIAGNOSTIC IGNORED \"-WINT-CONVERSION\"")\
RETURN ____##NAME(___BPF_SYSCALL_ARGS(ARGS));\
_PRAGMA("GCC DIAGNOSTIC POP")\
}\ }\
STATIC __ATTRIBUTE__((ALWAYS_INLINE)) TYPEOF(NAME(0)) ____##NAME(\
STRUCT PT_REGS *CTX, ##ARGS)
```

FIG. 4B

```
                      UNIFIED PROGRAM
                            302
# FOR __X64_SYS_OPEN
SEC("KPROBE/SYS_OPEN")
INT BPF_KPROBE_COMMON(BPF_SYS_OPEN, CONST
CHAR *FILENAME, INT FLAGS,
INT MODE)
{
CHAR BUF[PATHLEN]; // PATHLEN IS DEFINED TO 256
INT RES = BPF_PROBE_READ_USER_STR(BUF, SIZEOF(BUF),
FILENAME);
}
```

START

604

RECEIVE THE PROGRAM TO BE ATTACHED TO A FUNCTION

606

COMPILE THE RECEIVED PROGRAM USING A MACRO TO MAKE THE PROGRAM AGNOSTIC TO OPERATING SYSTEM VERSION

608

ATTACHING THE PROGRAM IN THE OPERATING SYSTEM BASED ON THE DETERMINED TYPE OF SYSCALL

610

END

700

SYSTEM AND METHOD FOR MAKING A PROGRAM COMPATIBLE ACROSS MULTIPLE-VERSIONS OF OPERATING SYSTEMS

BACKGROUND

Technical Field

The present disclosure relates to the field of low-level code instrumentation and analysis, and particularly relates to a system and method for making a program compatible across multiple-versions of operation systems.

Description of the Related Art

Modern computing systems, particularly those based on the Linux operating system, rely on intricate software structures to function efficiently. Critical components of the system, such as kernel functions and user space functions, are integral to the seamless operation of applications. Custom programs are used to get access to such function's argument through registers that may be accessed through an open-source library. In order to develop custom programs that can be executed during the invocation of the kernel functions or the user space functions, programs, such as through extended Berkeley Packet Filter (eBPF) technology are utilized that help in debugging the kernel functions and the user space functions. It may be noted that the programs that are hooked to the kernel functions are called kprobe, and the programs hooked to the user space functions are called uprobe. Further, the kprobe and the uprobe written for certain function can only be attached to the specific kernel function and the user space function with an exact function name in the underlying kernel and user space, or the attachment fails. Since different versions of the operating systems have different kernel functions and user space function names, a challenge arises in attaching the programs to the functions due to mismatch of the function names. For example, the newer version and the older Linux version have major differences in the newer and older Linux version i.e., the newer Linux version kernels have legacy syscalls that are wrapped under architecture specific names (for eg, _x64_sys_read) unlike older Linux version kernels (for eg, _sys_read).

There are two popular known ways to write such tracing and debugging programs for different versions for operating systems. First, by compiling the program on the Linux host, which requires headers and compilers to be installed for hooking such programs to kernel functions. Since the Linux kernel headers are available beforehand, it may be determined what is the function name where the program may be hooked. Second, by using a CO-Re feature of libbpf (cilium/ebpf), where programs are compiled once and can be used anywhere on any ebpf-supported Linux kernel. However, the known in the art solution works only if the operating system kernel has BPF Type Format (BTF) files and configuration extern is available in the BTF. Accordingly, making the program dependent on the operation system kernel version makes it incompatible to use across different operating system versions and makes the CO-RE unusable between systems that support legacy syscall and systems that support wrapped syscall.

Therefore, there is a need for a system and method for making a program compatible across multiple-versions of operation systems, and overcoming the above-mentioned drawbacks.

BRIEF SUMMARY

One or more embodiments are directed to a system, method, and computer program product for making a program compatible across multiple-versions of operating systems for tracing and observing functions. The program that helps in tracing and observing different functions are broadly referred to as probe. It may be noted that the varying function names between different versions of the operating system pose a challenge for writing compatible extended Berkeley Packet Filter (eBPF) programs. Additionally, differences in accessing function arguments in older and newer functions further complicate the compatibility issue. The disclosure aims to resolve these challenges by introducing a macro-based approach that determines the type of supported syscall based on flag information from a map and attaches the program to a function based on the determined type of supported syscall.

An embodiment of the present disclosure discloses a system for making a program compatible across multiple-versions of operating systems for tracing and observing functions. The system includes a receiver module to receive the program to be attached to a function. The program corresponds to an eBPF program. Further, the operating system is a Linux Operating system. Furthermore, the function is a kernel function and/or a user space function.

In an embodiment, the system includes a program compilation module to compile the received program using a macro to make the program agnostic to operating system version. The macro includes a conditional branching feature for determining type of supported syscall based on flag information from a shared map for attaching the program in different operating system versions. The shared map may correspond to a bpf map that includes the flag information indicative of the type of syscall supported by host operating system on which the probe needs to run. Further, the type of syscall includes legacy syscall and/or wrapped syscall. The macro further includes an internal helper function for processing of the program with syscall arguments to ensure compatibility. In an embodiment, the program compilation module forms a unified program, via the compilation using the macro, that invokes the program when attached to the function.

In an embodiment, the system includes a program attachment module to attach the program in the operating system based on the determined type of syscall. In one scenario, the program is attached to a first function if the determined type of syscall is of a first type. The first function may correspond to a non-wrapped function. In another scenario, the program is attached to a second function if the determined type of syscall is of a second type. The program attachment module adds an entry indicative of the second function in the shared map. The second function may correspond to a wrapped function. Based on the reading of the flag information, the program can be attached with the right function irrespective of the version of operating systems. Once the unified program is creating, during provisioning of the probe at a client environment, the system can attach the probe to the right function based on determination of the flag information from an BPF map.

An embodiment of the present disclosure discloses a method for making a program compatible across multiple-versions of operating systems for tracing and observing functions. The method includes the steps of receiving the program to be attached to a function. Upon receiving the program, the method includes the steps of compiling the received program using a macro to make the program agnostic to operating system version. Such macro includes a conditional branching feature for determining type of supported syscall based on flag information from a shared map for attaching program in different operating system versions. The method also includes the steps of forming a unified program, via the compilation using the macro. Thereafter, the method includes the steps of attaching the program to the operating system based on the determined type of syscall. In one scenario, the program is attached to a first function (such as non-wrapped function) if the determined type of syscall is of a first type. In another scenario, the program is attached to the second function (such as wrapped function) if the determined type of syscall is of second type. In order to do such attachment, the method includes the steps of adding an entry indicative of the second function in the shared map.

An embodiment of the present disclosure discloses a computer program product including at least one non-transitory computer-readable storage medium having computer-executable program code portions stored therein for making a program compatible across multiple-versions of operating systems for tracing and observing functions. The computer program product receives the program to be attached to a function. Upon receiving the program, the computer program product compiles the received program using a macro to make the program agnostic to operating system version. Such macro includes a conditional branching feature for determining type of supported syscall based on flag information from a shared map for attaching program in different operating system versions. The computer program product forms a unified program, via the compilation using the macro, that invokes the program when attached to the function. Thereafter, the computer program product attaches the program in the operating system based on the determined type of syscall. In one scenario, the program is attached to a first function (such as non-wrapped function) if the determined type of syscall is of a first type. In another scenario, the program is attached to the second function (such as wrapped function) if the determined type of syscall is of second type. In order to do such attachment, the computer program product adds an entry indicative of the second function in the shared map.

In an embodiment, the disclosed system, method, and computer program product (together called as disclosed mechanism) for making a program compatible across multiple-versions of operating systems for tracing and observing functions enables eBPF programs to be compatible across different versions of operating systems. Further, the disclosed mechanism allows for dynamic determination of the type of syscall, ensuring flexibility in program attachment. Further, the disclosed mechanism utilizes a macro-based approach making a unified program that can be compiled once and used across different kernel versions.

The features and advantages of the subject matter here will become more apparent in light of the following detailed description of selected embodiments, as illustrated in the accompanying FIGURES. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 4B illustrates an exemplary macro, in accordance with an embodiment of the present disclosure.

FIG. 4C illustrates an exemplary unified program, in accordance with an embodiment of the present disclosure.

Figure 1:
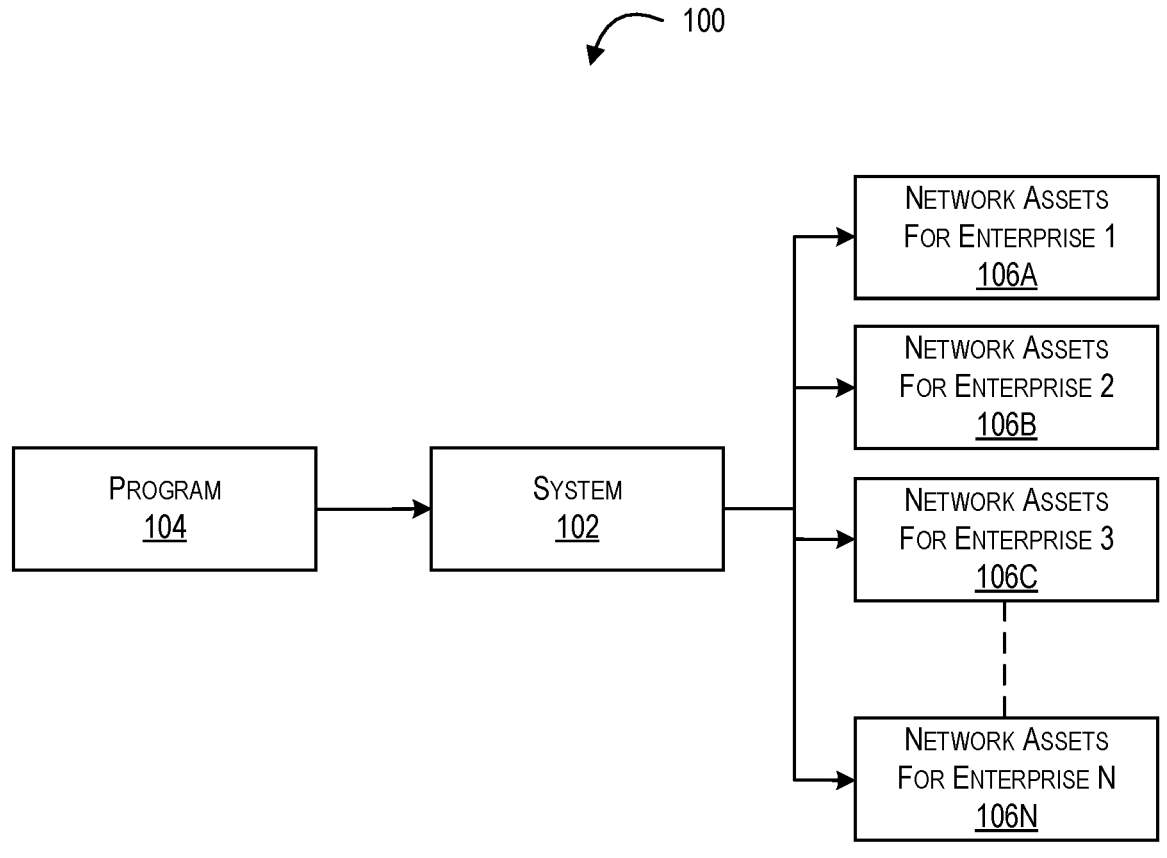
FIG. 1 illustrates an exemplary environment having network assets for various enterprises connected to a system for making a program compatible across multiple-versions of operating systems for tracing and observing functions, in accordance with an embodiment of the present disclosure.

Other features of embodiments of the present disclosure will be apparent from accompanying drawings and detailed description that follows.

DETAILED DESCRIPTION

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure relate to a system, method, and computer program product (together referred to as 'disclosed mechanism') for making a program compatible across multiple-versions of operating systems for tracing and observing functions. The disclosed mechanism intricately addresses the multifaceted challenges encountered in achieving compatibility for programs (such as eBPF programs) across a spectrum of operating system versions (such as old and new versions of Linux) where discrepancies in kernel function names and variations in the mechanisms for accessing function arguments pose significant obstacles while attaching the programs to the functions. The disclosed mechanism may overcome such obstacles through a systematic solution that makes programs agnostic to the underlying operating system version, allowing seamless compatibility across different versions of the operating system. The disclosed mechanism may utilize the receiver module as the entry point for receiving programs to be attached to the function. This module acts as an interface for accepting programs that are intended for attachment to specific functions within the operating system.

In an embodiment, the disclosed mechanism may utilize a program compilation module operating at the heart of the disclosure. The program compilation module may employ a sophisticated macro with a conditional branching feature to dynamically determine the type of supported syscall during the compilation process through a shared map, such as a bpf map. The shared map may store flag information that decisively indicates the type of syscall, whether it be a legacy syscall or a wrapped syscall. The intricate nature of this compilation process may ensure that the resulting program is agnostic to the underlying operating system version.

In an embodiment, the disclosed mechanism may utilize a program attachment module for the seamless integration of the compiled program into the operating system. The program attachment module may dynamically determine the type of syscall based on the flag information obtained from the shared map during the compilation phase. As a result, the program may be attached to a specific function within the operating system. The determination of whether the syscall is of a legacy or wrapped type dictates whether the program is attached to a non-wrapped or wrapped function, respectively.

Accordingly, the disclosed mechanism has several advantages over the prior arts. The inclusion of a shared map as a dynamic source of flag information enhances flexibility and adaptability to evolving kernel versions. The macro-based compilation ensures a unified program that can be compiled once and deployed across multiple versions, streamlining the development process. The disclosed mechanism proves particularly beneficial for tracing and observing both kernel and user functions across a diverse landscape of kernel versions. The disclosed mechanism, with its nuanced and comprehensive methodology, not only overcomes the challenges associated with compatibility but also offers a sophisticated and future-proof solution for environments, such as a dynamic Linux kernel environment.

FIG. 1 illustrates an exemplary environment 100 having network assets for various enterprises 106A, 106B, 106C, . . . , 106N (hereinafter known as "network assets of enterprise" 106) connected to a system 102 for making a program 104 compatible across multiple-versions of operating systems for tracing and observing functions, in accordance with an embodiment of the present disclosure. In a non-limiting embodiment, the operating system may be a Linux operating system and the program 104 may be an extended Berkeley Packet Filter (eBPF) program. Further, the functions may, without any limitation, correspond to a kernel function and a user space function. In an embodiment, the user functions are associated with a user space i.e. a part of memory where regular applications and software run. For example, web browsers, word processors, games, and other software applications that operate in the user space. Such functions perform tasks that the users directly interact with, like browsing the internet, typing documents, and playing games. The eBPF programs attached to functions within the user space to trace and monitor their activities are called uprobes. Such tracing and monitoring allows debugging, profiling, and performance analysis of the user functions. In an embodiment, the kernel functions are associated with a kernel space i.e., a protected part of memory where the core functions of the operating system, including the device drivers and low-level system processes, reside. Typically, when the user functions need to perform a task that requires access to hardware or sensitive system resources, it requests the kernel to perform that task on its behalf. For example, when a user space function wants to read data from a hard disk, then it requests the kernel to handle the disk I/O operations. The eBPF programs attached to functions within the kernel space to trace and monitor their activities are called kprobes. Such tracing and monitoring allows tracing and analyze low-level system behavior. In a non-limiting example, when dealing with binaries that utilize Transport Layer Security (TLS) libraries such as OpenSSL, the uprobe may be attached to critical functions like SSL_read and/or SSL_write that handle plaintext data which makes them crucial for security monitoring.

In an embodiment, the function may, without any limitation, include a non-wrapped function and a wrapped function. The non-wrapped function may correspond to a legacy system call or kernel function whose usage remains consistent across different kernel versions without any additional architectural or version-specific wrapping. Accordingly, the non-wrapped function typically follows the traditional naming conventions without any architecture-specific prefixes or modifications. For example, a "sys_open" system call in the Linux kernel for representing the operation of opening a file, as shown below:

```
#include <Linux/fs.h>
asmlinkage long sys_open(const char __user *filename,
    int flags, umode_t mode);
```

The wrapped function may correspond to a system call or kernel function that has been modified or "wrapped" with architecture-specific or version-specific prefixes or alterations to accommodate changes in naming conventions or to provide compatibility with different architectures or versions of the operating system. Such wrapping allows the kernel to handle architecture-specific implementations while providing a standardized interface for system calls. The use of wrapped functions is common in modern kernels to support diverse architectures and maintain compatibility across different versions. Typically, in newer versions of the kernel, especially those that support 64-bit x86 architectures, system calls like "sys_open" are often wrapped with architecture-specific identifiers. For example: a "_x64_sys_open" system call in the Linux kernel representing the operation of opening a file, as shown below:

```
#include <Linux/fs.h>
asmlinkage long __x64_sys_open (const char __user *file-
    name, int flags, umode_t mode);
```

In an embodiment, the system 102 may be connected to the network assets of enterprise 106 via a network. The network (such as a communication network) may include, without limitation, a direct interconnection, a Local Area Network (LAN), a Wide Area Network (WAN), a wireless network (e.g., using Wireless Application Protocol), the Internet, and the like. Further, the network assets of enterprise 106 may, without any limitation, include assets, such as routers, switches, hubs, firewalls, printers, hosts, servers, and wireless access points having different software configurations in terms of at least Operating System (OS), applications, patches, and updates. For tracing and monitoring the functions associated with such assets, a user may create a program 104 that may be attached to a function in the OS of the network asset of enterprise 106. The program 104 may correspond to an Extended Berkeley Packet Filter (eBPF) that may serve as a powerful tool for tracing and monitoring either or both of kernel and user space functions. The user may create custom eBPF programs that may be executed when specific user or kernel functions are invoked.

In operation, the system 102 may receive the program 104 (created by the user) for tracing and observing functions in the OS of the network asset of the enterprise 106. Since operating system versions of the various network assets of the enterprise 106 may be different, the function names in the various network assets of the enterprise 106 may be different. It may be apparent to a person skilled in the art that in order to attach the program 104 to the function in the operating system, the function name has to be exactly the same in the program as in the library of the operating system. Thus, the system 102 may compile the received program using a macro to make a unified program agnostic to operating system version. Such macro may essentially include a conditional branching feature for determining type of supported syscall based on flag information for attaching the program in different operating system versions. Such flag information may be derived from a shared map, such as bpf map including the flag information indicative of the type of syscall, such as a legacy syscall and/or a wrapped syscall. Upon creating the unified program that is agnostic to the operating system version, the system 102 may attach the program in the operating system based on the determined type of syscall. In one scenario, the program 104 may be attached to a first function, i.e. a non-wrapped function, if the determined type of syscall is of a first type. In another scenario, the program 104 may be attached to a second function, i.e. a wrapped function, if the determined type of syscall is of a second type. For attaching the program 104 to the second function, the system 102 may add an entry indicative of the second function in the shared map.

Figure 2:
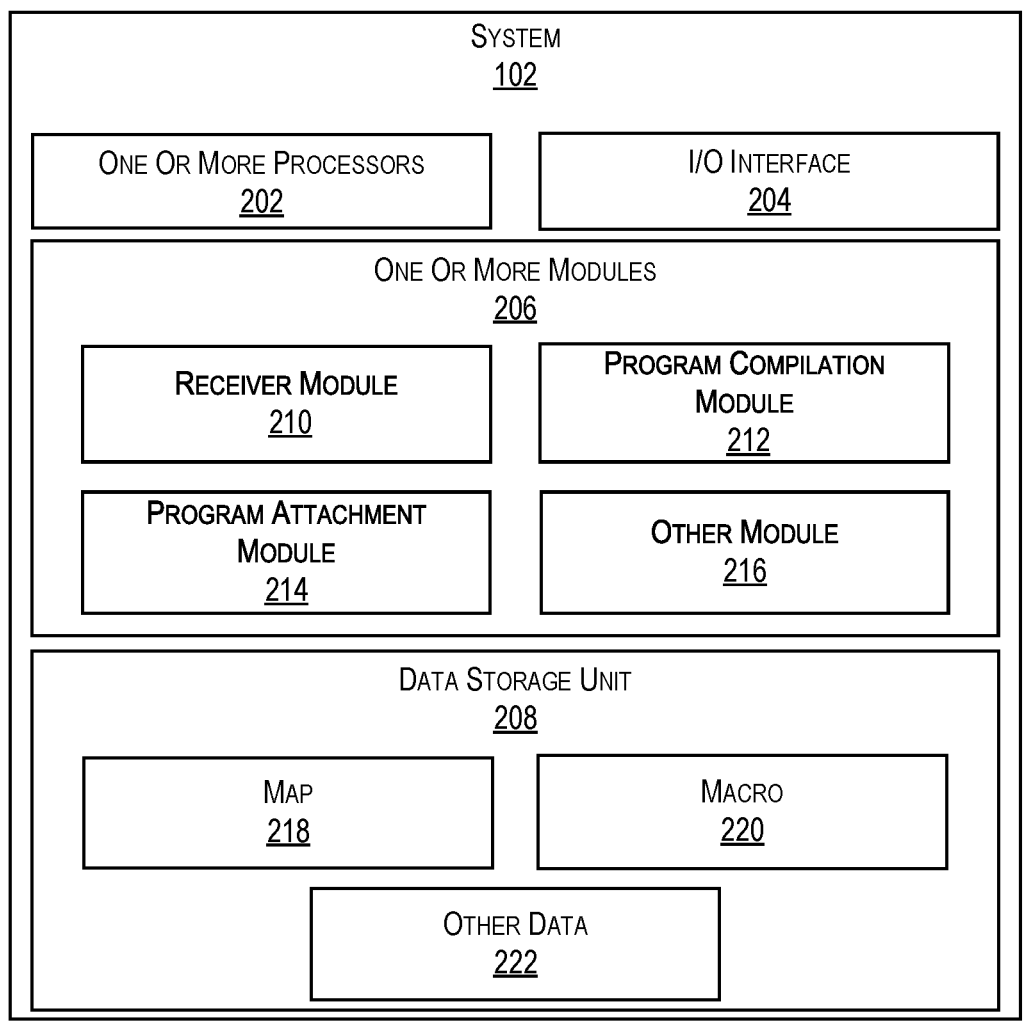
FIG. 2 illustrates a block diagram of the system for making a program compatible across multiple-versions of operating systems for tracing and observing functions, in accordance with an embodiment of the present disclosure.

FIG. 2 illustrates a block diagram 200 of the system 102 for making the program 104 compatible across multiple-versions of operating systems for tracing and observing functions, in accordance with an embodiment of the present disclosure.

In an embodiment, the system 102 may include one or more processors 202, an Input/Output (I/O) interface 204, one or more modules 206, and a data storage unit 208. The one or more processors 202 may be implemented as one or more microprocessors microcomputers, microcomputers, digital signal processors, central processing units, state machines, logic circuitries, and/or any devices that manipulate signals based on operational instructions. Further, the I/O interface 204 may serve as the pivotal bridge connecting the internal processes of the system 102 with its external environment for facilitating the exchange of information between the system 102 and its users or external devices. Furthermore, the I/O interface 204 may contribute to the user experience by providing intuitive means for input, such as through keyboards or touchscreens, and presenting meaningful output via displays or other output devices.

In an embodiment, the one or more modules 206 may include a receiver module 210, a program compilation module 212, a program attachment module 214, and any other module 216 essential or required for the working of the system 102. In an embodiment, the data storage unit 208 may include a map 218 (such as bpf map), a macro 220, and any other data 222 required for the working of the system 102. In an embodiment of the present disclosure, the one or more processors 202 and the data storage unit 208 may form a part of a chipset installed in the system 102. In another embodiment of the present disclosure, the data storage unit 208 may be implemented as a static memory or a dynamic memory. In an example, the data storage unit 208 may be internal to the system 102, such as an onside-based storage. In another example, the data storage unit 208 may be external to the system 102, such as cloud-based storage. Further, the one or more module 206 may be communicatively coupled to the data storage unit 208 and the one or more processor 202 of the system 102. The one or more processors 202 may be configured to control the operations of the one or more module 206.

In an embodiment, the receiver 302 may receive the program 104 to be attached to a function. The program 104 may correspond to an eBPF program for tracking and observing functions, such as monitoring incoming network packets on a specific network interface and filter out packets coming from a particular IP address (e.g., 192.168.1.1). Such program 104 needs to be attached to function pertaining to a network interface that a user wants to filter the packets. Similarly, the function may correspond to a function that receives network packets and processes them, such as 'process_packet'. Thus, the program 104 needs to be attached to this function for monitoring and modifying the behavior of the 'process_packet' function. However, the name of the function may differ in various operating systems and since the function name has to be exactly the same for attachment, the system 102 may further process the received program 104 to make it agnostic of the operating system version, as discussed in the following paragraphs.

In an embodiment, the program compilation module 212 may compile the received program 104 using the macro 220 to make the program agnostic to operating system version. Such program may be termed as a unified program that may invoke the program 104 when attached to the function. Further, the macro 220 may include a conditional branching feature for determining type of syscall based on flag information from a shared map for attaching the program in different operating system versions. The shared map may enable communication between the program 104 and user-space applications or other parts of the kernel. The shared map may be essential for exchanging data, allowing the program 104 to store and retrieve information in a way that is accessible both from the kernel and from user space. The shared map may, without any limitation, include hash maps, array maps, and other maps tailored to specific use cases.

In an embodiment, the shared map may correspond to a bpf map that may include the flag information indicative of the type of syscall. The type of syscall may, without any limitation, include legacy syscall and wrapped syscall. The legacy syscalls may correspond to traditional system calls that follow an older naming convention, such as those with names starting with "sys_" (e.g., sys_open, sys_read). The wrapped syscalls may correspond to system calls having architecture-specific or version-specific prefixes added to their names, such as "_x64_sys" (e.g., _x64_sys_open, _x64_sys_read). It may be apparent to a person skilled in the art that the transition from the legacy syscalls to the wrapped syscalls often occurs in newer Linux kernel versions, where architectural changes or enhancements necessitate a modified naming scheme. Since transition may be to accommodate diverse architectures and maintain compatibility across different kernel versions, allowing for streamlined functionality and standardized interfaces for system calls across various platforms.

In an embodiment, the macro 220 may include helper function for processing of the program 104 with syscall arguments to ensure compatibility by ensuring the seamless and standardized operation of the program 104 across different versions of the operating system. By encapsulating the intricacies of handling syscall arguments within the macro 220, the helper function may abstract the variations in accessing arguments between legacy syscalls and wrapped syscalls and provide a uniform interface, allowing the user to write the program 104 without needing to explicitly deal with differences in operating system versions. The operation of the program compilation module 212 to form the unified program has been explained in detail in the following paragraphs.

In an embodiment, the program attachment module 214 may attach the program 104 in the operating system based on the determined type of syscall. In one scenario, the program 104 may be attached to a first function if the determined type of syscall is of a first type. In another scenario, the program is attached to a second function if the determined type of syscall is of a second type. In order to attach the program to the second function, the program attachment module 214 may add an entry indicative of the second function in the shared map. It may be noted that the first function may correspond to a non-wrapped function when the first type of syscall is the legacy syscall and the second function may correspond to a wrapped function when the second type of syscall is a wrapped syscall. The operation of the program attachment module 214 to attach the program to the function has been explained in detail in the following paragraphs.

Figures 3, 4A:
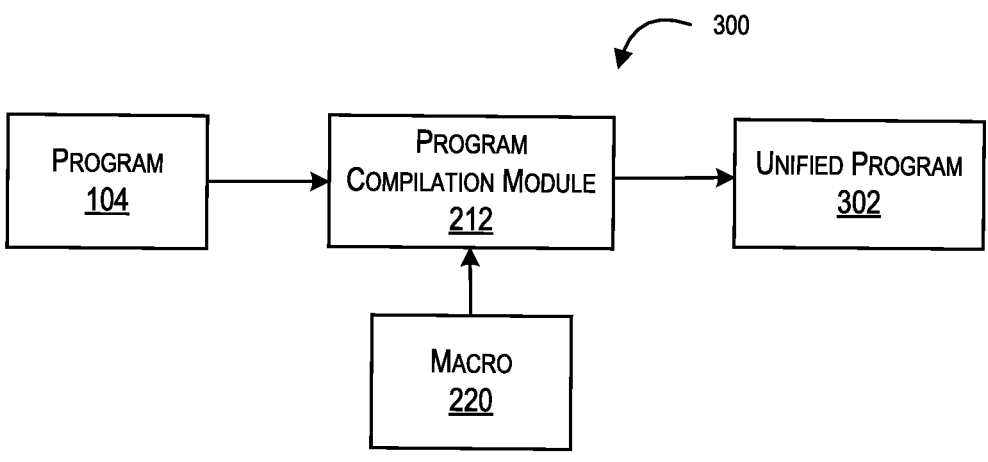
FIG. 3 illustrates a block diagram showing working of a program compilation module, in accordance with an embodiment of the present disclosure.
FIG. 4A illustrates an exemplary program, in accordance with an embodiment of the present disclosure.

FIG. 3 illustrates a block diagram 300 showing working of the program compilation module 212, in accordance with an embodiment of the present disclosure. FIG. 4A illustrates an exemplary program 104, in accordance with an embodiment of the present disclosure. FIG. 4B illustrates an exemplary macro 220, in accordance with an embodiment of the present disclosure. FIG. 4C illustrates an exemplary unified program 302, in accordance with an embodiment of the present disclosure. For the sake of brevity, FIGS. 3, 4A, 4B, and 4C have been explained together.

In an embodiment, the program compilation module 212 may compile the received program 104. In an exemplary embodiment, as shown in FIG. 4A, the program 104 may be designed as a kernel probe (kprobe) attached to the system call "sys_open" in the Linux kernel for providing a means of tracing file-opening events by capturing relevant information for further analysis or monitoring purposes. The program 104 may utilize the eBPF framework to trace the opening of files within the kernel. Upon the invocation of the "sys_open" system call, the associated function "bpf_sys_open" may be triggered, receiving information through the context structure "struct pt_regs *ctx."

In an embodiment, the compilation may be done using the macro 220, as shown in FIG. 4B. In an exemplary embodiment, as shown in FIG. 4B, the macro 220, named "BPF_KPROBE_COMMON," for the creation of the program 104 with enhanced flexibility and compatibility across various versions of the Linux kernel, is shown. The macro 220 may encapsulate the logic needed for determining the appropriate syscall type during program execution and may take a syscall function name and its arguments as parameters and dynamically select the correct implementation based on the presence or absence of an entry in the "is_syscall_wrapper" bpf map. Further, the macro 220 may include the conditional branching feature to check if the syscall is wrapped (architecture-specific) or not. If the syscall is not wrapped, the macro 220 may invoke the legacy syscall implementation, otherwise, the macro 220 may direct the program 104 to the wrapped syscall logic. Thus, the macro 220 may form the unified program 302, as shown in FIG. 4C, that may adapt to the syscall variations in different Linux kernel versions, promoting compatibility and consistent performance across diverse environments.

In an exemplary embodiment, as shown in FIG. 4C, the unified program 302 agnostic to operating system version that invoke the program 104 when attached in the function is shown. As shown, the unified program 302 may be an eBPF program created for kernel tracing purposes, specifically targeting the "_x64_sys_open" system call in the Linux kernel. By employing the "BPF_KPROBE_COMMON" macro 220, the unified program 302 may demonstrate a versatile and version-agnostic design. Additionally, the unified program 302 may also utilize the macro 220 to handle variations in syscall implementations by distinguishing between legacy syscalls and wrapped syscalls based on the presence of an entry in the "is_syscall_wrapper" bpf map. Further, the unified program 302 may be attached to the "sys_open" system call and read the user-space string argument, 'filename,' using the "bpf_probe_read_user_str" function. Thus, the unified program 302 may allow CO-Re feature by compiling once and deployment across different versions of the Linux kernel, ensuring consistent and adaptable functionality for tracing file-opening events.

Figure 5:
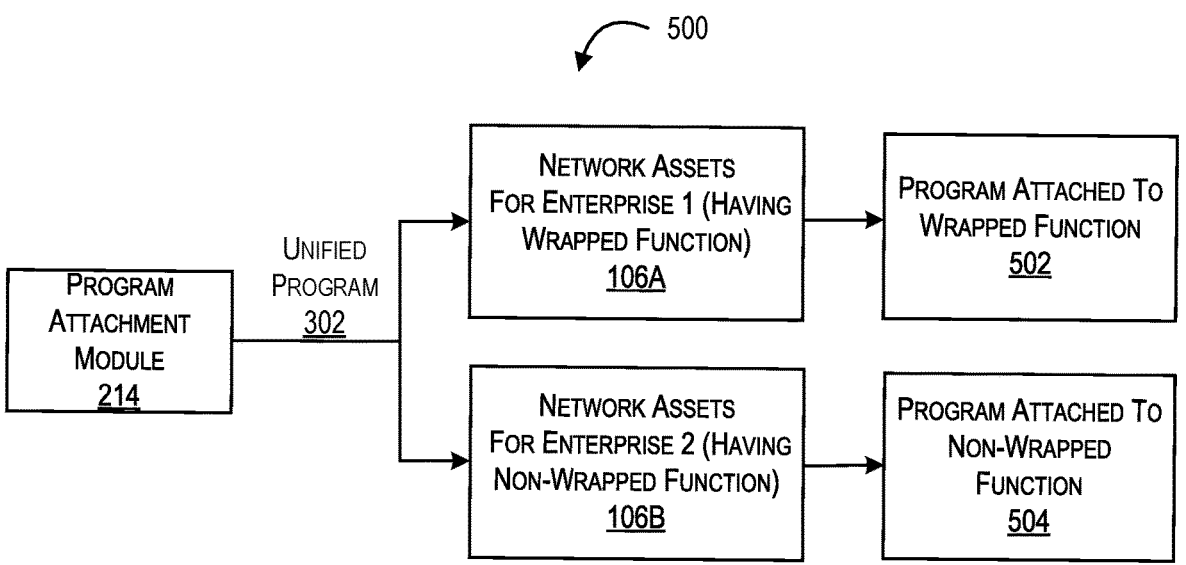
FIG. 5 illustrates a block diagram showing working of a program attachment module, in accordance with an embodiment of the present disclosure.

FIG. 5 illustrates a block diagram 500 showing working of the program attachment module 214, in accordance with an embodiment of the present disclosure. In an embodiment, the program attachment module 214 may utilize a common unified program 302 to attach the program 104 in the operating system of the network assets for enterprise 106 irrespective of the corresponding operating system versions. Such attachment of the program 104 may be based on the determined type of syscall. In one scenario, the network asset for enterprise 1 106A may have a wrapped function based on its corresponding operating system and the program attachment module 214 may attach the program 104 to the wrapped function, as shown by 502. In another scenario, the network asset for enterprise 2 106B may have a non-wrapped function based on its corresponding operating system and the program attachment module 214 may add an entry indicative of the non-wrapped function in the bpf map attach the program 104 to the non-wrapped function, as shown by 504.

Figure 6:
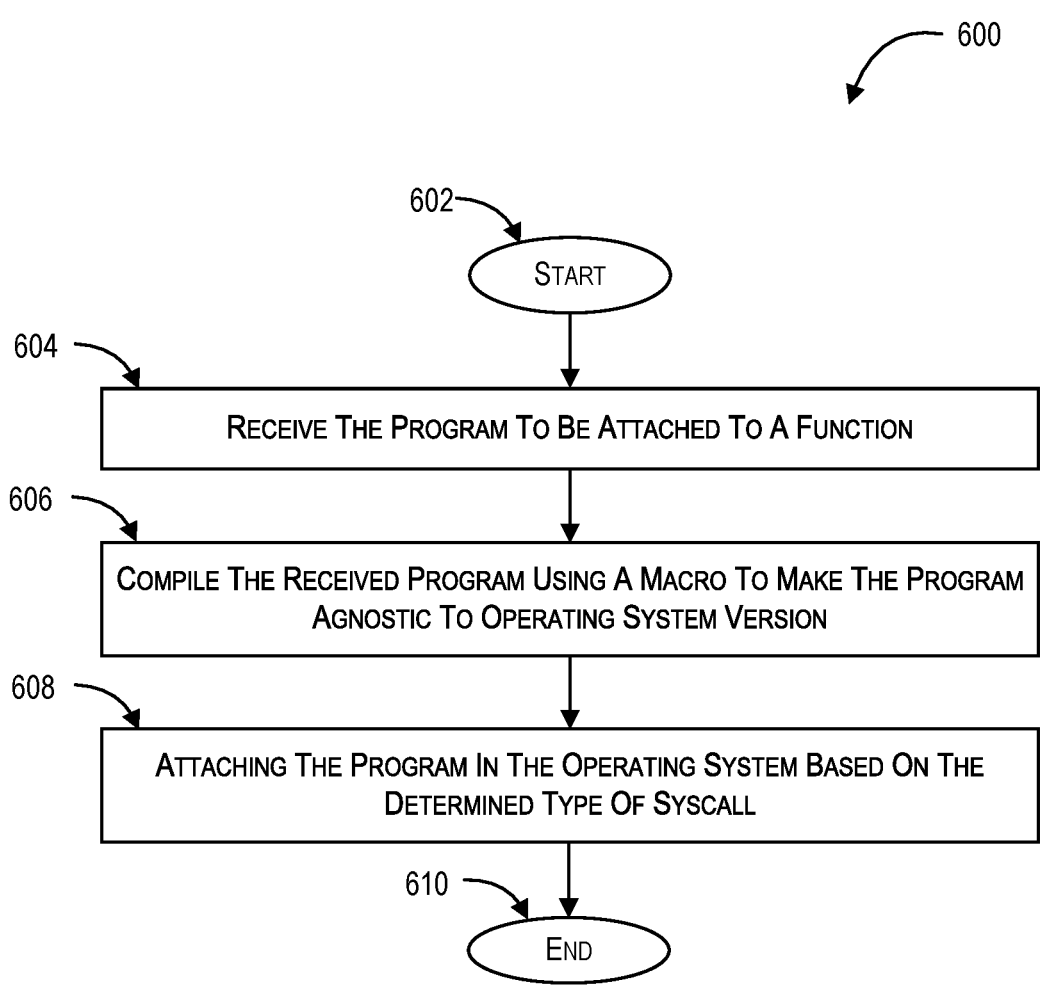
FIG. 6 is a flow chart of a method for making a program compatible across multiple-versions of operating systems for tracing and observing functions, in accordance with an embodiment of the present disclosure.

FIG. 6 is a flow chart 600 of a method for making a program compatible across multiple-versions of operating systems for tracing and observing functions, in accordance with an embodiment of the present disclosure. The method starts at step 602.

At first, the program to be attached to a function may be received, at step 604. The operating system may correspond to a Linux operating system. Further, the program may include an extended Berkeley Packet Filter (eBPF) program. Furthermore, the function may correspond to a kernel function and/or a user space function.

Next, the received program may be compiled using a macro to make the program agnostic to operating system version, at step 606. The macro may include a conditional branching feature for determining type of supported syscall based on flag information from a shared map for attaching the program in different operating system versions. The shared map may correspond to a bpf map that may include the flag information indicative of the type of syscall. The type of syscall may, without any limitation, include legacy syscall and wrapped syscall. Additionally, the macro may further include an internal helper function for processing of the program with syscall arguments to ensure compatibility. In an embodiment, the method may include the steps of forming an unified program, via the compilation using the macro, that may invoke the program when attached to the function.

Next, the program may be attached to the operating system based on the determined type of syscall, at step 608. In one scenario, the program may be attached to a first function if the determined type of syscall is a first type. The first function may correspond to a non-wrapped function. In another scenario, the program may be attached to a second function if the determined type of syscall is a second type. The second function may correspond to a wrapped function. In order to attach the program to the second function, the method may include the steps of adding an entry indicative of the second function in the shared map. The method ends at step 610.

Figure 7:
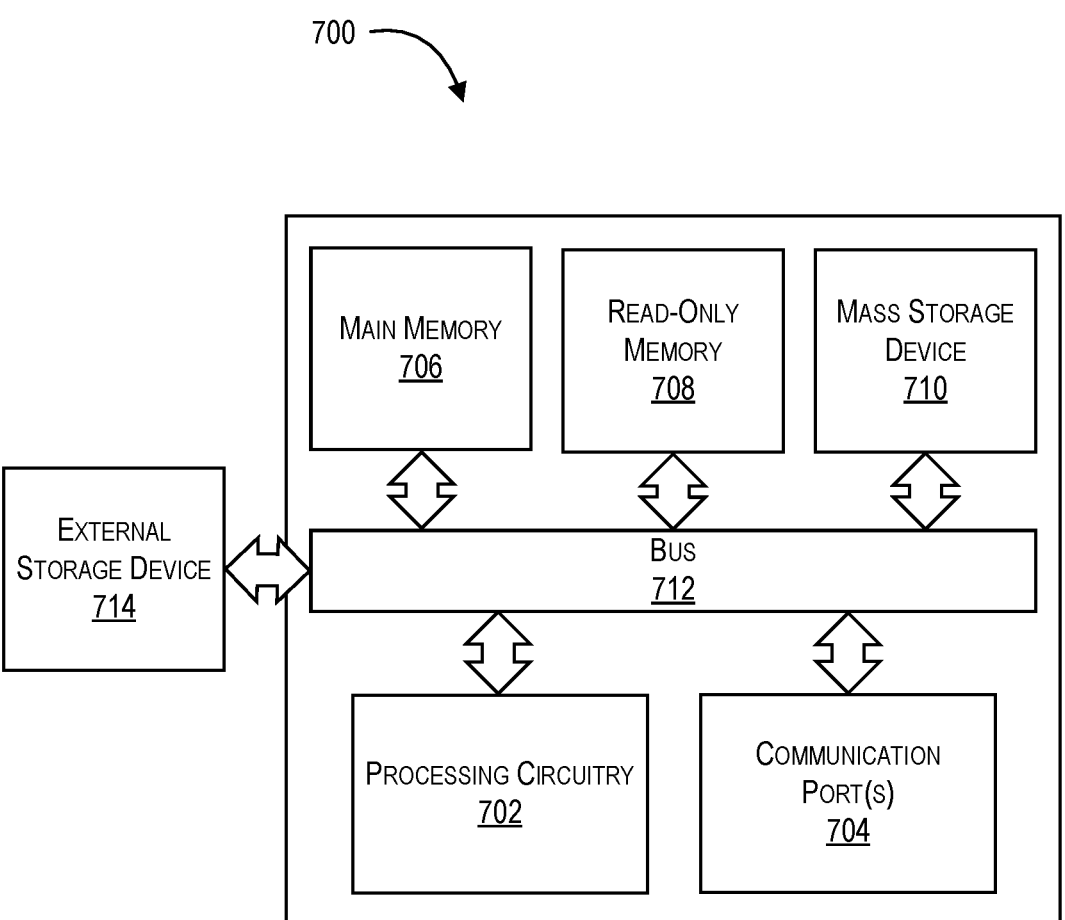
FIG. 7 illustrates an exemplary computer unit in which or with which embodiments of the present disclosure may be utilized.

FIG. 7 illustrates an exemplary computer system in which or with which embodiments of the present disclosure may be utilized. As shown in FIG. 7, a computer system 700 includes an external storage device 714, a bus 712, a main memory 706, a read-only memory 708, a mass storage device 710, a communication port 704, and a processor 702.

Those skilled in the art will appreciate that computer system 700 may include more than one processor 702 and communication ports 704. Examples of processor 702 include, but are not limited to, an Intel® Itanium® or Itanium 2 processor(s), or AMD® Opteron® or Athlon MP® processor(s), Motorola® lines of processors, Forti-SOC™ system on chip processors or other future processors. The processor 702 may include various modules associated with embodiments of the present disclosure.

The communication port 704 can be any of an RS-232 port for use with a modem-based dialup connection, a 10/100 Ethernet port, a Gigabit or 10 Gigabit port using copper or fiber, a serial port, a parallel port, or other existing or future ports. The communication port 704 may be chosen depending on a network, such as a Local Area Network (LAN), Wide Area Network (WAN), or any network to which the computer system connects.

The memory 706 can be Random Access Memory (RAM), or any other dynamic storage device commonly known in the art. Read-Only Memory 808 can be any static storage device(s) e.g., but not limited to, a Programmable Read-Only Memory (PROM) chips for storing static information e.g., start-up or BIOS instructions for processor 702.

The mass storage 710 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

The bus 712 communicatively couples processor(s) 702 with the other memory, storage, and communication blocks. The bus 712 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 702 to a software system.

Optionally, operator and administrative interfaces, e.g., a display, keyboard, and a cursor control device, may also be coupled to bus 704 to support direct operator interaction with the computer system. Other operator and administrative interfaces can be provided through network connections connected through communication port 704. An external storage device 710 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

What is claimed is:

1. A system for making a program compatible across multiple-versions of operating systems for tracing and observing functions, the system comprises:

a receiver module to receive the program to be attached to a function;

a program compilation module to compile the received program using a macro to make the program agnostic to operating system version, wherein the macro includes a conditional branching feature for determining type of supported syscall based on flag information from a shared map for attaching the program in different operating system versions; and a program attachment module to attach the program in the operating system based on the determined type of syscall, wherein the program is attached to a first function if the determined type of syscall is of a first type, and wherein the program is attached to a second function if the determined type of syscall is of a second type.

2. The system of claim 1, wherein the shared map corresponds to a bpf map that includes the flag information indicative of the type of syscall.

3. The system of claim 1, wherein the type of syscall comprises at least one of: legacy syscall and wrapped syscall.

4. The system of claim 1, wherein the program attachment module adds an entry indicative of the second function in the shared map.

5. The system of claim 1, wherein the macro further includes an internal helper function for processing of the program with syscall arguments to ensure compatibility.

6. The system of claim 1, wherein the program compilation module forms a unified program, via the compilation using the macro, that invokes the program when attached in the function.

7. The system of claim 1, wherein the first function corresponds to a non-wrapped function, and wherein the second function corresponds to a wrapped function.

8. The system of claim 1, wherein the operating system is a Linux operating system, wherein the program is an extended Berkeley Packet Filter (eBPF) program, and wherein the function is at least one of: a kernel function and a user space function.

9. A method for making a program compatible across multiple-versions of operating systems for tracing and observing functions, the method comprises:

receiving the program to be attached to a function;

compiling the received program using a macro to make the program agnostic to operating system version, wherein the macro includes a conditional branching feature for determining type of supported syscall based on flag information from a shared map for attaching the program in different operating system versions; and attaching the program in the operating system based on the determined type of syscall, wherein the program is attached to a first function if the determined type of syscall is of a first type, and wherein the program is attached to a second function if the determined type of syscall is of a second type.

10. The method of claim 9, wherein the shared map corresponds to a bpf map that includes the flag information indicative of the type of syscall, and wherein the type of syscall comprises at least one of: legacy syscall and wrapped syscall.

11. The method of claim 9, further comprises adding an entry indicative of the second function in the shared map.

12. The method of claim 9, wherein the macro further includes an internal helper function for processing of the program with syscall arguments to ensure compatibility.

13. The method of claim 9, further comprises forming an unified program, via the compilation using the macro, that invokes the program when attached to the function.

14. The method of claim 9, wherein the first function corresponds to a non-wrapped function, and wherein the second function corresponds to a wrapped function.

15. The method of claim 9, wherein the operating system is a Linux operating system, wherein the program is an extended Berkeley Packet Filter (eBPF) program, and wherein the function is at least one of: a kernel function and a user space function.

16. A computer program product comprising at least one non-transitory computer-readable storage medium having computer-executable program code portions stored therein for making a program compatible across multiple-versions of operating systems for tracing and observing functions, the computer program product configured to:

receive the program to be attached to a function;

compile the received program using a macro to make the program agnostic to operating system version, wherein the macro includes a conditional branching feature for determining type of supported syscall based on flag information from a shared map for attaching the program in different operating system versions; and attach the program in the operating system based on the determined type of syscall, wherein the program is attached to a first function if the determined type of syscall is of a first type, and wherein the program is attached to a second function if the determined type of syscall is of a second type.

17. The computer program product of claim 16, further comprises adding an entry indicative of the second function in the shared map, wherein the shared map corresponds to a bpf map that includes the flag information indicative of the type of syscall, and wherein the type of syscall comprises at least one of: legacy syscall and wrapped syscall.

18. The computer program product of claim 16, further comprises forming a unified program, via the compilation using the macro, that invokes the program when attached in the function, wherein the macro further includes an internal helper function for processing of the program with syscall arguments to ensure compatibility.

19. The computer program product of claim 16, wherein the first function corresponds to a non-wrapped function, and wherein the second function corresponds to a wrapped function.

20. The computer program product of claim 16, wherein the operating system is a Linux operating system, wherein the program is an extended Berkeley Packet Filter (eBPF) program, and wherein the function is at least one of: a kernel function and a user space function.

* * * * *